No. 877,260. PATENTED JAN. 21, 1908.
T. B. TIEFENBACHER.
PNEUMATIC TIRE.
APPLICATION FILED MAR. 16, 1907.
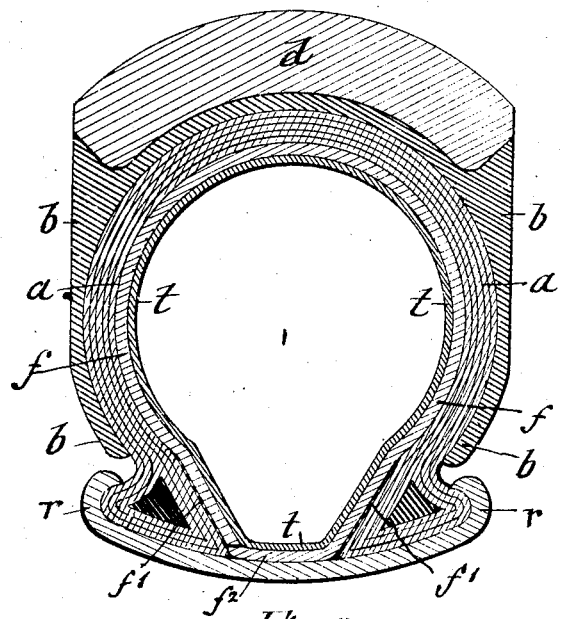
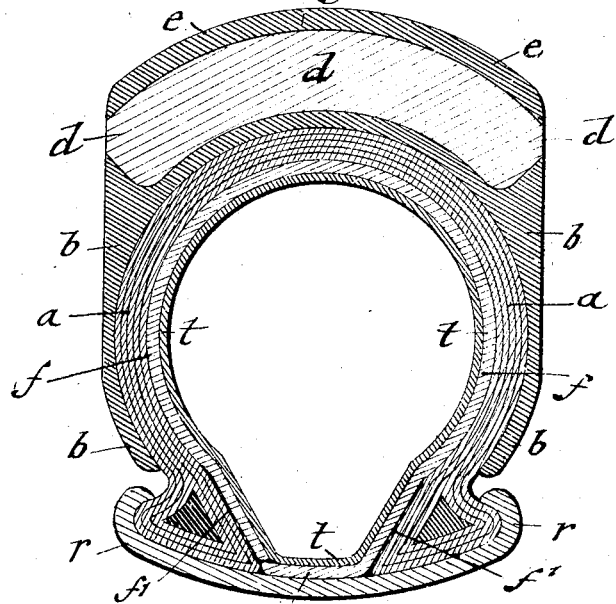

UNITED STATES PATENT OFFICE.

THOMAS B. TIEFENBACHER, OF NEW YORK, N. Y.

PNEUMATIC TIRE.

No. 877,260.  Specification of Letters Patent.  Patented Jan. 21, 1908.

Application filed March 16, 1907. Serial No. 362,679.

*To all whom it may concern:*

Be it known that I, THOMAS B. TIEFENBACHER, a citizen of the United States, residing in New York, in the borough of Manhattan, county and State of New York, have invented certain new and useful Improvements in Pneumatic Tires, of which the following is a specification.

This invention relates to an improved tire for automobiles and other vehicles, which is provided with an exterior flexible thread for protecting the interior air-tube against punctures, and which is provided with a protecting layer between the air-tube and its sheath for absorbing the moisture and preventing the heating up of the air-tube; and for this purpose the invention consists of a pneumatic tire which comprises an interior air-tube, a sheath surrounding the air-tube, an elastic covering layer for said sheath, and a tread of felt on the outer circumference of said layer.

The invention consists further of a pneumatic tire which comprises an interior air-tube, a covering sheath for the same, a layer of felt or other absorbent material between the air-tube and sheath, an elastic layer inclosing the sheath, a tread of felt on the outer circumference of said layer, and an elastic covering for said tread.

The invention consists further of certain details of construction which will be fully described hereinafter and finally pointed out in the claims.

In the accompanying drawing, Figure 1 represents a vertical transverse section of my improved pneumatic tire, showing the exterior felt-tread, and Fig. 2 is a similar section, with an elastic covering extending around the felt-tread.

Similar letters of reference indicate corresponding parts throughout the figures of the drawing.

Referring to the drawing, $t$ represents an inflated air-tube of any approved construction, and $a$ a covering sheath for the same. The sheath $a$ surrounds the air-tube $t$ and is again inclosed by a covering layer $b$ of soft rubber of suitable thickness, which is connected to the sheath, the latter being attached to the rim $r$ of the wheel in the usual manner. To the outer circumference of the covering layer $b$ is applied a tread $d$ of felt of suitable thickness, preferably of that kind which is used for piano-hammers and the like, and which is capable of resisting the piercing of the covering layer and sheath by nails, stones and other sharp articles, so as to protect the air-tube against puncture and collapse.

The felt-tread $d$ is vulcanized, cemented or otherwise attached to the outer circumference of the layer $b$ so as to adhere firmly to the circumference of the same. The tire may be used either in this form, or the felt-tread may be again protected by an outer elastic covering $e$ of soft rubber, thereby increasing the protection for the air-tube $t$ and its sheath $a$. The tread of felt may be either in one continuous piece extending around the circumference of the covering layer, or of several sections which are made to abut against each other at their ends. Between the air-tube $t$ and the covering sheath $a$ is interposed a layer $f$ of felt or other absorbent material which is vulcanized or cemented at its ends to the inner ends of the sheath $a$, as shown at $f^1$, the main portion of the tubular layer being loose and disconnected so as to expand freely with the air-tube when the latter is inflated. One end of the felt-layer $f$ is extended sufficiently beyond the end $f^1$, which is fastened to the inner end of the sheath $a$, to form a layer $f^2$ that extends over the portion of the rim between the inner ends of the sheath $a$ and prevents thereby the contact of the inflated air-tube with the rim. The intermediate layer $f$ of felt protects the air-tube $t$ and the inside of the sheath by absorbing the moisture which is carried to the same with the air, and prevents the heating up of the tire and thereby the softening of the rubber from which the air-tube is made. Explosions of the tire through the heating of the air-tube are also prevented.

My improved tire has the following advantages: first, that the felt-tread prevents skidding owing to its increased friction with the surface of the ground; second, that the felt-tread prevents puncturing of the air-tube and its sheath; third, that the felt-tread renders the tire very durable as the wear is mainly taken up by the felt-tread; and, fourth, that by the layer of felt interposed between the air-tube and the covering sheath, the deterioration of the air-tube and its collapse by overheating are prevented.

Having thus described my invention, I claim as new and desire to secure by Letters Patent:

1. A pneumatic tire for automobiles and other vehicles, consisting of an air-tube, a covering sheath surrounding the same, a layer of felt interposed between the air-tube and the sheath, a covering layer of elastic material, and a tread of felt secured permanently to the outer circumference of said layer.

2. A pneumatic tire for automobiles and other vehicles, consisting of an interior air-tube, a covering sheath surrounding said air-tube, a layer of felt interposed between the air-tube and sheath, said layer being attached to the inner ends of the sheath and provided with an extension fitting between the air-tube and rim so as to inclose the air-tube, an outer elastic covering layer, and a tread of felt on the outer circumference of said layer.

In testimony, that I claim the foregoing as my invention, I have signed my name in presence of two subscribing witnesses.

THOMAS B. TIEFENBACHER.

Witnesses:
PAUL GOEPEL,
HENRY J. SUHRBIER.